F. E. TEN EYCK.
AIR PUMP.
APPLICATION FILED JAN. 8, 1912.
1,075,674.
Patented Oct. 14, 1913.
4 SHEETS—SHEET 1.
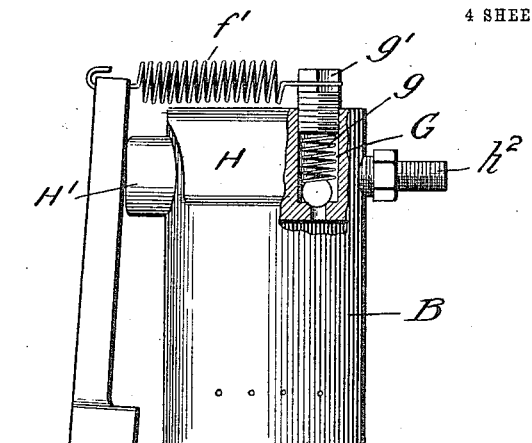
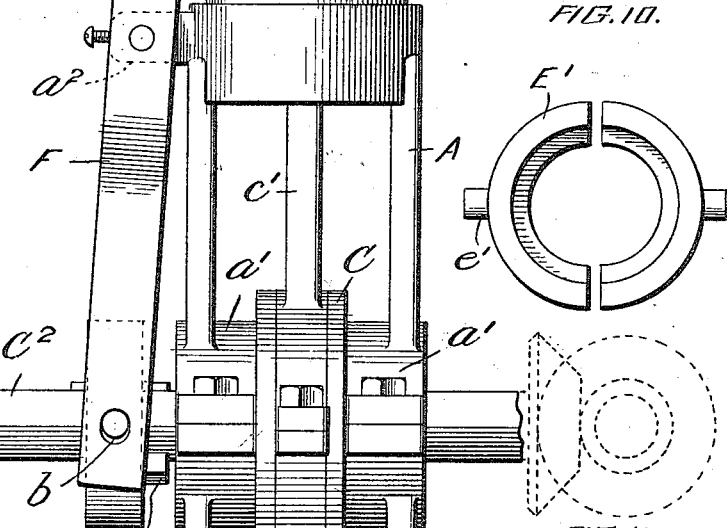
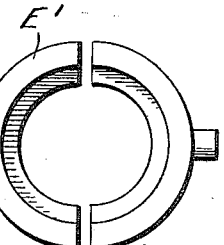
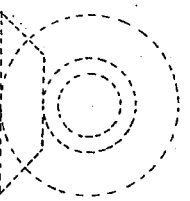
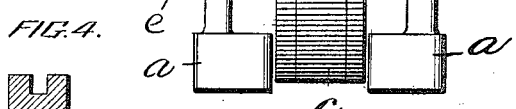
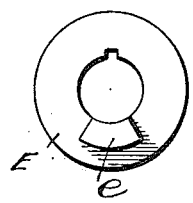
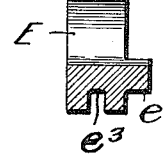
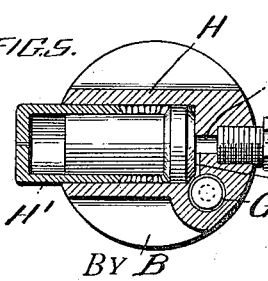
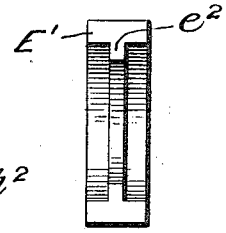
INVENTOR
Frank E. Ten Eyck
By Whitaker Prevost
Attorneys

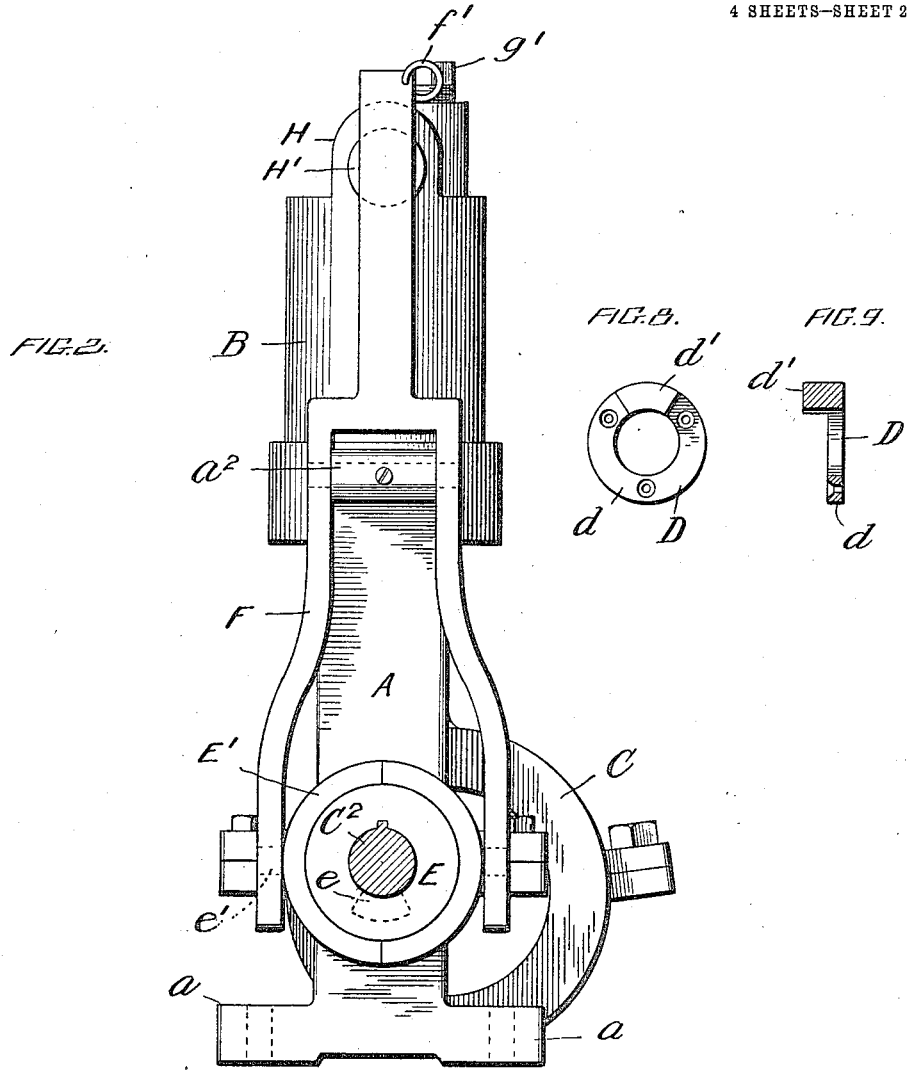

F. E. TEN EYCK.
AIR PUMP.
APPLICATION FILED JAN. 8, 1912.

1,075,674.

Patented Oct. 14, 1913.
4 SHEETS—SHEET 3.

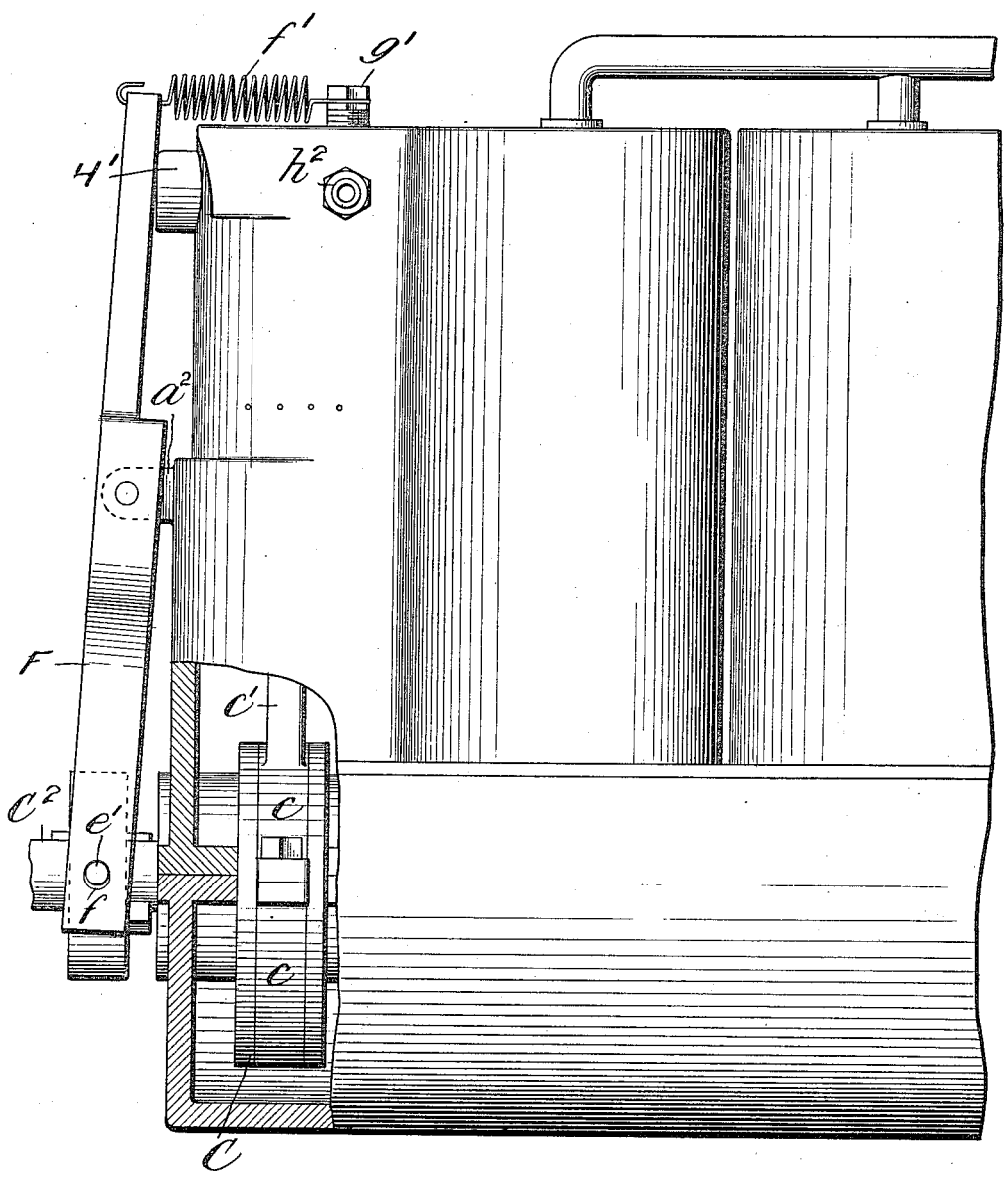

UNITED STATES PATENT OFFICE.

FRANK E. TEN EYCK, OF BOSTON, MASSACHUSETTS.

AIR-PUMP.

1,075,674.   Specification of Letters Patent.   Patented Oct. 14, 1913.

Application filed January 8, 1912. Serial No. 670,102.

*To all whom it may concern:*

Be it known that I, FRANK E. TEN EYCK, a citizen of the United States, residing at Boston, in the county of Suffolk and State of Massachusetts, have invented certain new and useful Improvements in Air-Pumps; and I do hereby declare the following to be a full, clear, and exact description of the invention, such as will enable others skilled in the art to which it appertains to make and use the same.

My present invention relates to the class of air or gas pumps and more particularly to pumps of this class designed for use in automobiles for inflating tires and other purposes. While my said pump is designed more particularly for the uses just mentioned it may also be used for compressing air or gas wherever it may be found adapted to the work required.

In the accompanying drawings I have illustrated the best form in which I have contemplated embodying my invention and said invention is set forth in the following description and claims.

Figure 12:
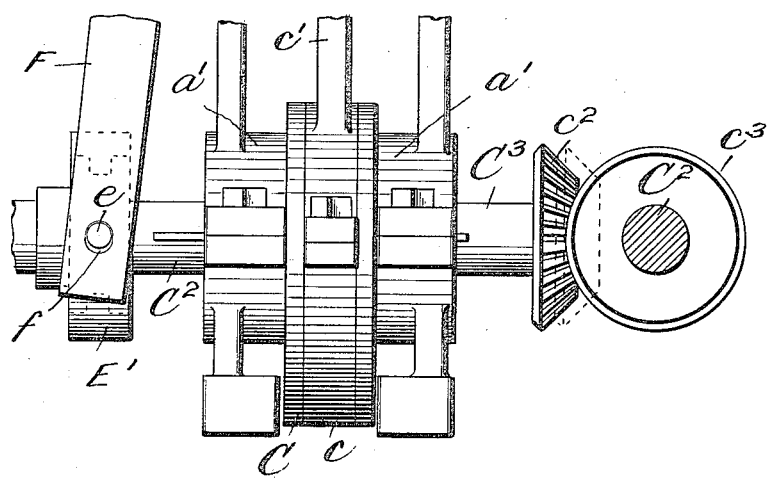
Figure 13:
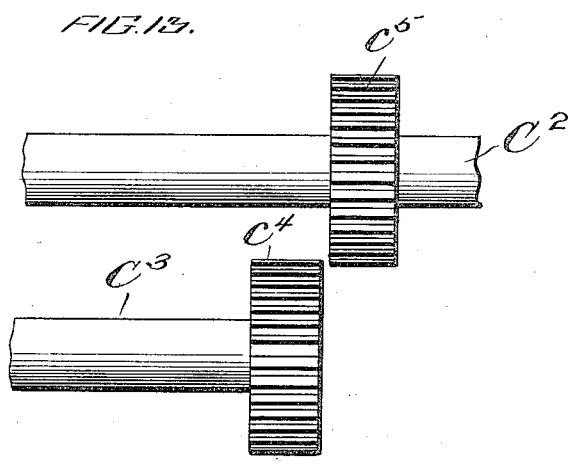

In the said drawings, Figure 1 is a front view in elevation of my improved pump with a part at the top broken away to show the valve chamber and valve. Fig. 2 is a view in elevation of the left hand end of the same. Fig. 3 is a front view of the movable clutch member. Fig. 4 is a sectional view of the same. Fig. 5 is a horizontal sectional view of a pressure cylinder and piston and connections at the top of the pump cylinder for moving the clutch lever. Fig. 6 is a view of the clutch end of the eccentric and sleeve carrying the same. Fig. 7 is a vertical section of the construction shown in Fig. 6. Fig. 8 is a front view of the collar or ring secured to the eccentric actuating sleeve. Fig. 9 is a sectional view of the devices shown in Fig. 8. Figs. 10 and 11 are two views of the sectional collar surrounding the movable clutch member for moving the same. Fig. 12 is a modified form of mechanism for connecting and disconnecting the pump eccentric with actuating devices. Fig. 13 is an illustration of another modification. Fig. 14 is a form of pump integrally connected with the cylinder of the engine.

In these drawings A is the supporting or main frame of the pump having at the top thereof integral therewith or connected thereto, the pump cylinder B.

The bottom of the frame is preferably provided with laterally extending ears $a$ having openings therein for bolts, by means of which the frame may be rigidly secured to the structure to which it is to be applied, or to a supplemental base of a character to adapt the pump to the said structure. As the pump is primarily intended for use with automobiles, I propose to construct a number of bases adapted to secure the pump in the various automobile structures in use and thus be enabled to, at once, select the form of base which will enable me to attach the pump to any type of automobile.

The pump piston is of the general type of piston shown in my former Patent No. 987,332, Mar. 21, 1911. This piston is actuated by an eccentric C, eccentric strap and rod $c$, $c'$. This eccentric is mounted upon and secured to or forms a part of a sleeve or hollow shaft C' shown in section in Fig. 7. The main or supporting frame is provided with bearings $a'$ in which the ends of the hollow shaft are revolubly mounted.

If the construction of the structure to which the pump is applied will permit of such a placement, a shaft of such structure that is most constantly in motion is selected and the hollow shaft C' is loosely mounted thereon and the following described means are provided to connect said motive shaft and the hollow shaft of the eccentric and to disconnect them therefrom.

One end of the hollow shaft is recessed to receive the clutch member D (see Figs. 6, 7, 8 and 9). This member consists of the ring or collar $d$ fitting the said recess of the hollow shaft or sleeve and is provided with the projection $d'$ which is preferably of considerably greater extent than the thickness of the collar. The recess is also preferably made of such depth that the projection $d'$ will not extend beyond the end of the shaft or sleeve. This member is detachably secured in any preferred manner to the shaft or sleeve C' so that the two shall at all times move in unison. By this construction, in case of wear or injury to this clutch member, it can be easily and cheaply repaired or replaced by a new member.

The other and movable clutch member E (see Figs. 3 and 4) is splined or otherwise secured to the shaft $C^2$ so as to permit of its moving longitudinally thereof but to turn therewith. This clutch member is provided with the projection $e$ and the member is so placed that this projection will extend toward the other clutch member in the recessed end of the hollow shaft or sleeve. The movement of this member of the clutch is effected through the medium of the lever F which is pivoted upon a projection $a^2$ extending outwardly from one end of the main frame. This lever has its lower end bifurcated and the lower ends of the two parts are provided with openings $f$ slightly elongated vertically. In these openings are placed the trunnions $e'$ of the semi-circular parts $E'$ of a collar surrounding the movable clutch member. Each of these parts is provided on the inner side of the same with the rib $e^2$ which engages the centrally located circumferential groove $e^3$ of the clutch member E. By preference the lower separated parts of the lever F are made with such a degree of resiliency as to yield sufficiently to permit the placing of the parts $E'$ in operative relation to the clutch member with the ribs $e^2$ in the groove $e^3$ and the trunnions in the openings in the lower ends of the parts of lever F. The pump cylinder is preferably formed by boring the same out of a casting secured to or forming a part of the frame A.

The upper end of the pump cylinder is preferably reduced in size and is bored vertically to form the valve chamber G and horizontally to form a cylinder H for the pressure piston $H'$ (see Figs. 1 and 5). The valve chamber G connects with the pump cylinder, which connection forms the outlet of the pump. The valve chamber is provided with a check valve preferably of the well known ball type. This valve is kept in the lower part of the valve chamber by a spring $g$, secured in the chamber by the screw plug $g'$ by which the pressure upon the valve is lessened or increased as may be desired.

The cylinder H is provided with an outlet $h$ (see Fig. 5) and is also connected with the valve chamber G. The outer end of the piston or a part connected therewith extends outwardly beyond the outer end of the cylinder H and bears against the upper end of the lever F, the said lever being maintained in contact with the piston by a spring $f'$ connecting it with the screw plug $g'$ or to some part of the upper end of the pump cylinder.

Connected with the outlet $h$ of the cylinder H is a pipe $h^2$ extending beyond the walls of the cylinder to which a flexible or other pipe can be secured to conduct the air from the pump to the tire or to such other place as it is desired to use it.

In most of the cases in which it is desired to use the pump the tire or other receptacle with which the pump is to be connected, will have a certain amount of air pressure within it and on making connection therewith the back pressure from the same will move the piston $H'$ outward against the lever F. Such pressure will swing the lever on its pivot causing the lower end of the same to slide the clutch member E inward into engagement with the clutch member on the end of the sleeve $C'$ causing the latter to rotate and operate the pump. So long as the pump continues in operation and the pump is connected with a tire or other receptacle the air pressure of the condensed air will hold the clutch members in engagement. When the pump is disconnected the spring $f'$ will draw the upper end of the lever F inward and disconnect the clutch members.

It may sometimes be desired to use the pump under circumstances in which there is no back pressure to move the piston $H'$. In such case the upper end of the lever F can be moved by hand to operate the clutch and start the movement of the pump piston. In order that this may be readily accomplished I provide the passageway or by-pass $h'$ leading directly from the valve chamber G to the outlet $h$. This provides a communication with the outlet from the pump when the piston $H'$ has been drawn inward by the spring $f'$ against the inner end of the cylinder H.

It may also be desired to use the pump in structures in which the sleeve or hollow shaft cannot be directly placed upon any shaft having the motion desired. In such cases I propose to employ a short additional shaft and connect it to a properly moving shaft by bevel gearing indicated by dotted lines, Fig. 1 and in full lines in Fig. 12. This will enable me to locate the additional shaft at an angle to the motive shaft. In such case I might change the means for connecting and disconnecting the pump eccentric with the actuating mechanism therefor. A form of such means is shown in Fig. 12 in which the short additional shaft $C^3$ is movable longitudinally and is splined to the eccentric. The shaft is moved by the lever F to throw the bevel gears $c^2$, $c^3$ into and out of mesh. In case, however, it should be desired to have the short additional shaft parallel to the motor shaft it may be connected therewith with spur gearing as indicated in Fig. 13. In such case the additional shaft will be movable longitudinally by the lever F as in the construction shown in Fig. 12 to throw the spur gears $c^4$, $c^5$ into and out of mesh. With this arrangement the gearing can be thrown into and out of mesh while the engine is in motion.

I have also contemplated constructing my pump integrally or in connection with the engine cylinders, as shown in Fig. 14. The pump will then be actuated and controlled as described in connection with Figs. 1 to 11.

I have shown and described the pump piston as reciprocated by an eccentric. This is my preferred form but a crank may be used in lieu thereof.

What I claim and desire to secure by Letters Patent is:—

1. In a pump of the class described, the combination with the piston operating devices adapted to be loosely mounted on an actuating shaft, a clutch for connecting said shaft and the piston operating devices, a lever for operating said clutch, an air pressure piston connected with said pump for operating the said lever by the pressure within the pump cylinder and its connections.

2. In a pump of the class described, the combination with the piston actuating devices adapted to be loosely mounted upon an actuating shaft, a clutch for connecting and disconnecting said shaft and said piston actuating devices, a lever for operating said clutch, a spring connected to said lever normally holding the clutch in inoperative position and an air pressure piston connected with the pump cylinder to move the lever against the force of said spring.

3. In a pump of the class described, the combination with the cylinder and piston, of actuating means for said piston, comprising a hollow shaft or sleeve, an eccentric secured thereto, the said hollow shaft or sleeve being adapted to be loosely mounted on a shaft of an independent motor mechanism, a clutch member secured to said sleeve, a clutch member adapted to be mounted upon the actuating shaft to turn therewith but slide longitudinally thereof, a lever for moving said clutch member, and pressure means connected with the pump cylinder to move said lever.

4. A pump of the class described for use in connection with an explosive engine, comprising a pump cylinder formed integrally with one of the cylinders of the engine, a piston in the pumping cylinder, piston actuating mechanism loosely engaging a straight portion of a shaft of the engine, a clutch for connecting the piston actuating mechanism to said shaft, a pressure cylinder and piston, and connections between the pressure piston and said clutch.

5. A pump of the class described comprising a pump cylinder and piston, piston actuating mechanism adapted to loosely engage an actuating shaft, a clutch for connecting said piston actuating mechanism with said shaft, including a movable clutch member, a collar connected therewith and provided with trunnions, a lever for actuating said clutch member provided with resilient arms having apertures therein to engage said trunnions, a pressure cylinder, a piston therein and connections between said piston and said lever.

6. A pump of the class described comprising a pump cylinder and piston, piston actuating mechanism adapted to loosely engage an actuating shaft, a clutch for connecting said piston actuating mechanism with said shaft, including a movable clutch member, a collar connected therewith and formed in separated halves each provided with a trunnion, a lever for operating said clutch member having separated resilient arms provided with apertures for engaging said trunnions and holding said collar sections in operative position, a pressure cylinder and a piston therein connected with said lever.

In testimony whereof I affix my signature, in the presence of two witnesses.

FRANK E. TEN EYCK.

Witnesses:
GEORGE S. HEDGE,
LYMAN W. GRIFFIN.

Copies of this patent may be obtained for five cents each, by addressing the "Commissioner of Patents, Washington, D. C."